3,281,508
METHOD OF BAKING PLASTER AT LOW TEMPERATURES

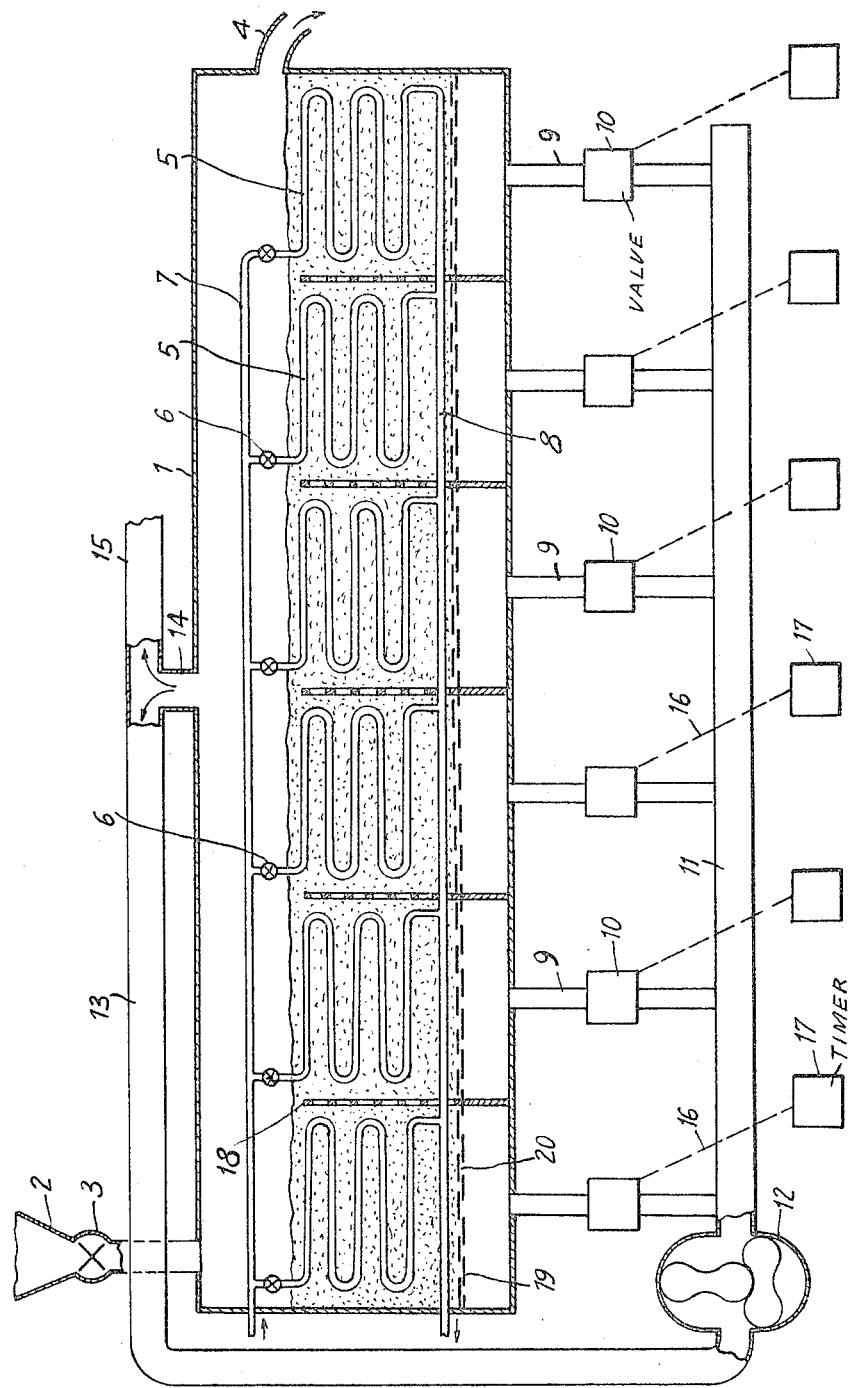

Noël Goulounes, Itteville, France, assignor to "Lambert Freres & Cie" Cormeilles en Parisis (Seine et Oise, France), a company
Filed Feb. 12, 1962, Ser. No. 172,648
Claims priority, application France, Feb. 14, 1961, 852,683
6 Claims. (Cl. 263—53)

The present invention is concerned with the baking of plaster.

The industrial baking of plaster at atmospheric pressure and at low temperatures (less than 200° C.) gives rise to various difficulties.

It is in fact necessary to manufacture for various uses plasters having very different qualities. However, by continuous baking in rotary kilns, it is not possible merely to vary the quality of plaster except between limits which are too narrow. Plaster baked in this manner usually results, after use in products which are less dense and less robust than those which are obtained from plaster which has been baked in apparatuses of the non-continuous working type.

The non-continuous baking of plaster which is carried out in kettles of various types also gives rise to various difficulties such as: a substantial and irregular consumption of driving power for the agitation of the material, poor thermal efficiency, low production of plaster per apparatus, the requirement for a large number of people to carry out and supervise the various operations, the need to carry out modifications of the installation in order to modify the quality of the plaster which are both very substantial, very long and very costly.

It is possible to overcome the difficulties explained above by application of the method which forms the subject of the present invention.

In accordance with this method, gypsum in the powdered or granular state is baked while being agitated with pulsations of steam injected into vessels containing heating elements or comprising heating walls. The regulation of the pulsations of steam both in frequency and time as well as the temperatures of the heating elements or heating walls makes it possible in a very simple manner to vary the quality of the plaster and to manufacture with a single apparatus the various qualities of plaster which is usually prepared by baking at low temperatures and by making use of various apparatuses.

The example which is described below refers specifically to one of the forms of embodiment of the said method.

Gypsum either in the cold state or which has been pre-heated is distributed uniformly at one end of a passageway in which there have been installed heating elements and devices for the injection of steam. The material which is agitated by the pulsation of steam progresses towards the other end of the passageway at which the plaster is extracted. In that portion of the passageway in which the gypsum is distributed, this latter is first brought to the vicinity of that temperature at which dehydration begins.

Finally, by progressing in the central portions of the passageway, the material gradually loses water and becomes transformed into semi-hydrated calcium sulphate, the material being then at temperatures between 110 and 130° C. Then, as it approaches the end of the passageway, the material which has been previously almost completely transformed into semi-hydrate is brought from 130°–135° C. up to 160°–180° C. for the purpose of eliminating the last traces of unbaked material and subsequently for the purpose of transforming a small portion of the semi-hydrate into soluble anhydrite, the effect of this latter product being to improve the retention of the qualities of the plaster prior to its use.

The injection of steam must last a relatively short time, namely between one hundredth of a second and five seconds. The remainder of the treatment period does not comprise any injection of steam. At each steam injection, the mass under treatment is fluidized. This state ceases after each injection. The pulsation frequency must be between 15 and 2000 pulses per hour during the transformation of the gypsum into semi-hydrate. This frequency can be higher at the beginning and at the end of the treatment and it is then even possible to proceed to a continuous fluidization treatment. Moreover, at the time of completion of the treatment, that is to say at the time of increase of temperature of the material from 130°–135° C. to 160°–180° C., the steam intended for the purpose of agitation can be mixed with air, or else air can even be employed alone, so as to activate the transformation of the semi-hydrate into soluble anhydrite.

It is preferable to ensure that the transformation of the gypsum into semi-hydrate is carried into effect in contact with heating elements having a surface area which is between one and five square metres per ton of treated material and that the temperature of the said heating elements is between 110° C. minimum and 300° C. maximum. In addition, it is useful to employ hollow heating elements through which there circulates one of the various fluids commonly employed such as steam under pressure, whether superheated or not, various liquids, combustion gases, and the like.

The examples specified below show how it is possible to modify the quality of the plaster by modifying the frequency of the pulsations of steam and the temperatures of the heating elements in the case of the application of the method to the continuous baking of plaster in a passageway in which there will be considered six successive zones from the admission of the raw gypsum to the outlet of the baked plaster.

In all these examples, the agitation was effected in all the zones of the apparatus by pulsations of saturating steam at low pressure (0.2 to 1 kilogram per square centimetre) and the heating elements immersed in the material have been heated by saturating steam at pressures comprised between 0.5 and 15 kilograms per square centimetre above atmospheric pressure.

*Example I.*—Preparation of plaster which results in dense and very robust products which are similar to the best plaster baked in kettles that is plaster mixed until saturation in a proportion of 176 grams of plaster for 100 grams of water.

The pressure of the steam supplied to the heating elements is 0.5 to 1 kilogram per square centimetre (above atmospheric pressure) in the first zone and 16 kilograms per square centimetre in the five following zones, while the pulse frequencies in the six zones are respectively 20, 1, 1, 6, 6 and 20 per minute.

*Example II.*—Preparation of plaster of a quality which is similar to that of various plasters baked in rotary kilns that is plaster mixed until saturation in a proportion of 135 grams of plaster for 100 grams of water.

The pressure of steam supplied to the heating elements is 1 to 2 kilograms per square centimetre in the first zone and 15 kilograms per square centimetre in each of the following zones, while the pulse frequencies in the six zones are respectively 20, 2, 2, 6, 6 and 20 per minute.

*Example III.*—Preparation of plaster which results in lightweight insulating products that is plaster mixed until saturation in a proportion of 104 grams of plaster for 100 grams of water.

The pressure of steam supplied to the heating elements is 15 kilograms per square centimetre in all zones and the pulse frequency is 20 per minute in all the zones.

In the above examples, the plaster products in question which are thus obtained are 62 to 66% by weight oversize over an empty screen having a mesh of 100 microns, 30 to 32% by weight oversize at 200 microns and 5 to 8% by weight oversize at 400 microns.

In order to regularize the progress of the material in the case of baking in a relatively short passageway, it can be useful to mount inside the said passageway vertical partitions which are either perforated or full. In this latter case, the material passes from one compartment into the following compartment by flowing over each partition as each pulsation takes place. The number of these partitions can vary according to the dimensions of the passageway and according to the quality of the plaster to be produced. When the length $l$ of the passageway is very great as compared with the depth $h$ of the layer of material (for example $l/h > 5$) it is possible not to make any division into compartments, inasmuch as the mixtures of materials derived from the various treatment zones are no longer sufficiently substantial to prove detrimental to the quality of the final product.

It will be understood that, in this mode of application of the method to the continuous baking of plaster, the various sections or compartments of the passageway can be replaced by various vessels arranged in a line or placed one above the other and forming part of a same assembly.

In accordance with a second form of embodiment, the method can be applied to the semi-continuous baking of plaster at low temperatures. The installation comprises in that case various vessels and the material is transferred from time to time from one vessel into another after having been subjected in each vessel to one of the various treatments previously indicated in the case of each section of the passageway employed in the continuous baking process.

A third form of embodiment makes it possible to apply the method to the non-continuous baking of plaster at low temperatures. Powdered gypsum is accordingly introduced in a vessel containing heating elements and steam-injection devices and both the agitation by pulsation of steam and the temperature of the heating elements are caused to vary systematically and as a function of time in order to obtain the desired quality of plaster.

In all the above-mentioned forms of embodiment of the method, it is an advantage to make use of the steam which is derived from the dehydration of the gypsum and which, after removal of dust, is partially recycled by means of a compression operation so as to be brought to a pressure which is sufficient for the application of the method.

The application of the method which has been described in the foregoing offers various advantages, especially the following:

(1) The installation is very simple; in particular, it does not include any mechanical agitator.

(2) The baking treatment can be continuous and thus provide all the advantages of continuous manufacturing processes.

(3) The baking of the plaster is carried out with a very good thermal efficiency.

(4) The agitation of the material by means of pulsations only necessitates a fluid consumption which is very much lower than that which is necessary for fluidization treatment while at the same time making it possible to vary the quality of the plaster within wider limits than those permitted by fluidization.

Although the present invention relates to a method of baking of plaster independently of any particular apparatus, there has been shown in the accompanying drawing a diagrammatic view of an installation for this purpose The reference 1 designates a passageway at one end of which the gypsum to be baked is uniformly distributed from a hopper 2 through a distributor 3, while the baked plaster passes out at 4 at the opposite end of the passageway. It has been assumed that the passageway is divided into six zones each comprising a heating element 5 shown in the form of a coil through which a heating fluid circulates under the control of a valve 6. The coils are supplied from a general conduit 7 with heating fluid and terminate in a common outlet pipe 8. Each zone includes an inlet 9 for the steam which is injected by pulsation under the control of a valve 10. The valves 10 are supplied with steam through the common delivery pipe 11 by a pump 12, the suction pipe 13 of which communicates with a steam outlet 14 provided at the top portion of the passageway. The said steam outlet 14 also communicates with an evacuation pipe 15 which is connected to a chimney, not shown, for the removal of the excess steam derived from the quantity of water which is extracted from the gypsum as a result of the baking treatment. Broken lines 16 represent diagrammatically the control for the valves 10 from timing mechanisms or timers 17. It can be seen that the injections effected in the various zones can be regulated independently according to the results desired.

There have been indicated at 18 the partial walls or partitions which may be required between the successive zones in order to reduce or prevent the mixing of the material between the successive zones. It will be understood that the zones which are shown as forming part of the same passageway could also be replaced by separate vessels arranged, for example in a row.

There has been diagrammatically indicated at 19 a partition for the distribution of steam located beneath the heating coils and forming passages, for example staggered passages 20.

I claim:

1. A method of baking plaster at low temperature consisting in introducing gypsum in a fine state successively into communicating closed areas provided with heating surfaces, heating said gypsum at progressively higher temperatures as it proceeds through said closed areas by bringing said heating surfaces to selected temperatures, agitating the gypsum while heating the same by intermittent steam fluidization and intermittently supplying said steam for said fluidization from a minimum of substantially 1 pulse per minute to a maximum of substantially 20 pulses per minute according to the product to be obtained with each pulse having a duration of between one-hundredth of a second and five seconds.

2. A method of baking plaster with claim 1 wherein said closed areas consists of a partitioned passageway through which the gypsum being treated progresses.

3. A method of baking plaster in accordance with claim 1 wherein said closed areas consists of a partitioned series of vessels through which the gypsum being treated progresses.

4. A method of baking plaster in accordance with claim 1 wherein the frequency of the intermittent fluidization is increased at the beginning and the end of the baking thereof during those phases of treatment when the temperature of the product is substantially less than 110° C. and more than 130° C. respectively.

5. A method of baking plaster in accordance with claim 1 wherein air is also supplied for fluidization at the end of treatment during that phase of treatment when the temperature of the product is substantially more than 130° C.

6. A method of baking plaster in accordance with claim 1 wherein steam supplied for fluidization is part of the steam evolving from the gypsum under treatment.

References Cited by the Examiner

UNITED STATES PATENTS

| | | | |
|---|---|---|---|
| 1,798,857 | 3/1931 | Tyler | 23—122 |
| 2,848,211 | 8/1958 | Ruehle | 263—53 |
| 2,953,365 | 9/1960 | McEntee | 263—53 |

FOREIGN PATENTS 773,808  5/1957  Great Britain.

FREDERICK L. MATTESON, Jr., *Primary Examiner.*

JOHN J. CAMBY, SAMUEL H. BLECH, *Examiners.*

S. E. MOTT, *Assistant Examiner.*